(12) United States Patent
Burkle

(10) Patent No.: US 6,202,504 B1
(45) Date of Patent: Mar. 20, 2001

(54) EXTENSION HANDLE FOR EMERGENCY OR SAFETY BRAKE LEVER

(76) Inventor: Edmund P. Burkle, 36 Middle Rd., Guilford, CT (US) 06437

( * ) Notice: Subject to any disclaimer, the term of this patent is extended or adjusted under 35 U.S.C. 154(b) by 0 days.

(21) Appl. No.: 09/286,105

(22) Filed: Apr. 2, 1999

(51) Int. Cl.[7] .............................. B60T 7/10; G05G 1/21
(52) U.S. Cl. ................................ 74/544; 74/523; 74/525
(58) Field of Search ............................ 74/523, 524, 525, 74/543, 544, 545; 188/79.55; 16/408, 426, 427, 438

(56) References Cited

U.S. PATENT DOCUMENTS

| | | | |
|---|---|---|---|
| D. 393,514 | * | 4/1998 | Hadley et al. ................ D34/27 |
| 757,195 | * | 4/1904 | Huff ............................ 16/422 |
| 1,593,338 | * | 7/1926 | Kipp ............................ 74/481 |
| 2,108,745 | * | 2/1938 | Dodd ............................ 74/525 |
| 2,278,645 | | 4/1942 | Chase . |
| 2,579,798 | | 12/1951 | Crabbs . |
| 4,136,579 | | 1/1979 | Robinson . |
| 4,741,222 | * | 5/1988 | Berndt .......................... 74/525 |
| 4,856,363 | | 8/1989 | LaRocca . |
| 5,022,283 | * | 6/1991 | Deslandes ..................... 74/523 |
| 5,131,116 | * | 7/1992 | Bowdler ........................ 16/427 |
| 5,509,326 | | 4/1996 | Belmond . |

FOREIGN PATENT DOCUMENTS

| | | | |
|---|---|---|---|
| 0 466 534 | * | 1/1992 | (EP) . |
| 61-115759 | * | 6/1986 | (JP) ............................ 74/544 |

\* cited by examiner

*Primary Examiner*—David A. Bucci
*Assistant Examiner*—William C Joyce
(74) *Attorney, Agent, or Firm*—Raymond A. Nuzzo

(57) ABSTRACT

The combination of an emergency brake system comprising a brake and an elongate hand lever that is vertically movable to a first position to engage the brake and to a second position to release the brake, and an extension handle attached to and angulated with respect to the elongate hand lever of the emergency brake system. The extension handle enables a driver of the vehicle to release or engage the brake without (i) diverting his or her line of vision below the vehicle windshield, and (ii) sustaining muscular or bodily strain.

9 Claims, 4 Drawing Sheets

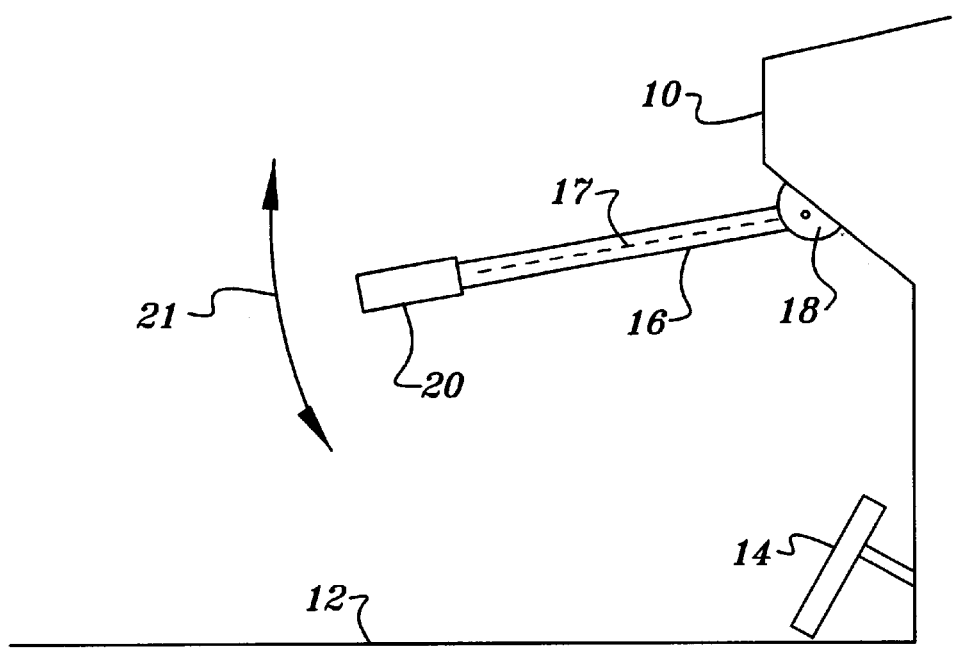
Fig. 1 *Prior Art*
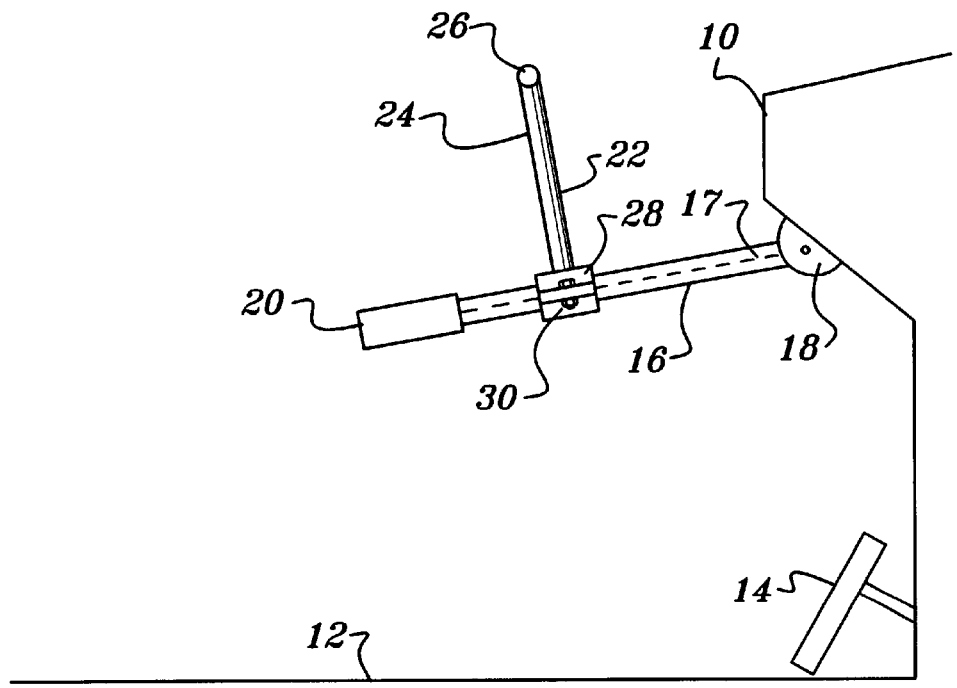
Fig. 2

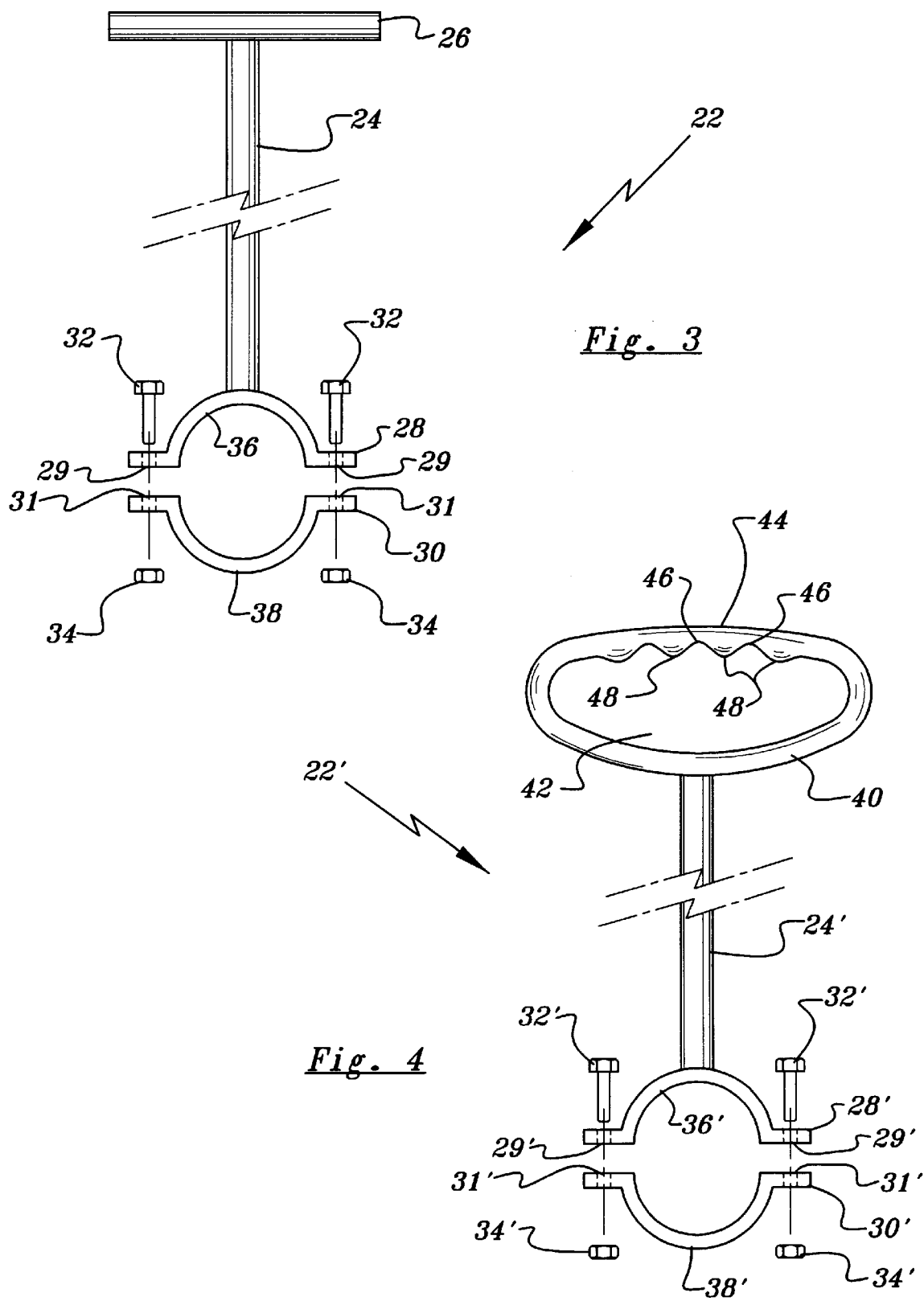

EXTENSION HANDLE FOR EMERGENCY OR SAFETY BRAKE LEVER

BACKGROUND OF THE INVENTION

1. Field of the Invention

The present invention generally relates to emergency brake levers.

2. Problem to be Solved

School bus drivers are required to set the parking/safety/emergency brake each and every time a student is dropped off or picked up. Often, this requirement is not met due to the inconvenient placement of the brake lever in many existing school buses and the tension that must be overcome by the driver on a repetitive basis to apply the brake. The repetitiveness of applying and releasing the brake can also cause muscular injury, e.g. carpal tunnel. Even if the driver does apply the parking/safety brake at each stop, he or she is forced to divert his or her line of vision below the windshield with a tendency to turn his or her head away thus taking his or her eyes off the students, the safety mirrors and approaching traffic. This creates a substantial safety risk to the students.

Therefore, it is an object of the present invention to provide a novel combination of an emergency brake lever and an extension handle that eliminates the problems discussed above.

It is another object of the present invention to provide a novel combination of an emergency brake lever and an extension handle that can be manufactured at reasonable costs.

Other objects and advantages of the present invention will be apparent to one of ordinary skill in the art in light of the ensuing description of the present invention.

SUMMARY OF THE INVENTION

The present invention is directed to the combination of an emergency brake system comprising a brake and an elongate lever that is vertically movable to a first position to engage the brake and to a second position to release the brake, and an extension handle attached to and angulated with respect to the lever. The handle enables a driver of the vehicle to release or engage the brake without (i) diverting his or her line of vision below the vehicle windshield, and (ii) sustaining muscular or bodily strain.

BRIEF DESCRIPTION OF THE DRAWINGS

The features of the invention are believed to be novel and the elements characteristic of the invention are set forth with particularity in the appended claims. The invention itself may best be understood by reference to the detailed description which follows taken in conjunction with the accompanying drawings in which:

FIG. 1 is side elevational view showing a vehicle interior that includes an emergency brake lever.

FIG. 2 is a side elevational view showing an extension handle attached to the emergency brake handle depicted in FIG. 1 in accordance with the present invention.

FIG. 3 is a front elevational view of the extension handle depicted in FIG. 2.

FIG. 4 is a front elevational view of an alternate embodiment of the extension handle depicted in FIG. 3.

DESCRIPTION OF THE PREFERRED EMBODIMENTS

Figure 5:
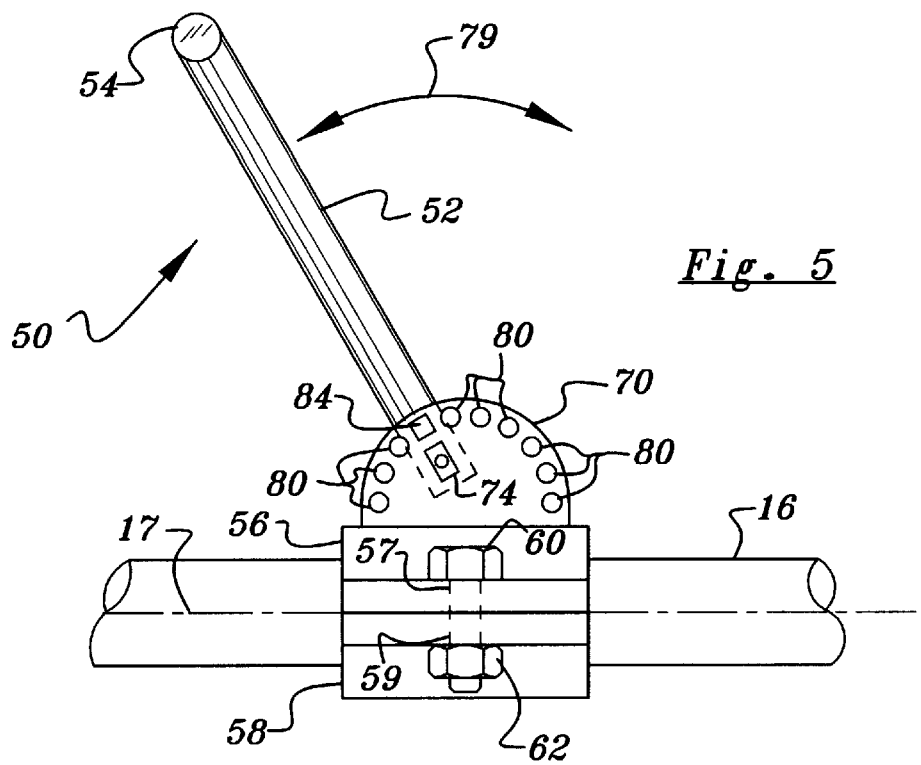
FIG. 5 is a side elevational view of a further embodiment of the extension handle depicted in FIG. 3 wherein the extension handle is pivotally attached to the emergency brake lever depicted in FIGS. 1 and 2.

In describing the preferred embodiments of the present invention, reference will be made herein to FIGS. 1–8 of the drawings in which like numerals refer to like features of the invention.

Referring to FIG. 1, there is shown a portion of the interior of a vehicle. The vehicle interior includes dashboard structure 10, vehicle floor 12, pedal 14 (e.g. gas, brake, clutch, etc.), emergency brake lever 16 and bracket 18. Lever 16 is pivotally attached to bracket 18. Lever 16 has a longitudinally extending bore that receives a cable (not shown) that is used to activate the emergency brake. Lever 16 has a longitudinally extending axis 17. Lever 16 further includes adjustment knob 20 that provides for adjustment of the tension of the cable. Typically, lever 16 has a generally circular cross-sectional shape. Lever 16 is pivoted to a first position to engage the emergency or safety brake and then to a second position to release the brake. The pivoting motion of lever 16 is indicated by arrow 21.

Referring to FIGS. 2 and 3, in accordance with the present invention, extension handle 22 is attached to lever 16. Handle 22 comprises shaft 24, hand grip 26, clamping plate 28, and complementary clamping plate 30. Screws 32 and nuts 34 are used to fasten together plates 28 and 30. Plates 28 and 30 have openings 29 and 31, respectively, for receiving screws 32. Plates 28 and 30 have inner surfaces 36 and 38, respectively, that contact the exterior surface of lever 16 when plates 28 and 30 are fastened together. Inner surfaces 36 and 38 have curvatures that generally conform to the curvature of lever 16. It is to be understood that plates 36 and 38 may be configured to have other shapes in the event lever 16 has a cross-sectional shape other than circular. Once plates 36 and 38 are fastened together, handle 22 is rigidly, but removably, attached to lever 16. When mounting handle 22 to lever 16, the user tighten screws 32 to a degree that allows the user to rotate handle 22 about lever longitudinal axis 17 in order to determine an optimum position of handle 22. Once such an optimum position is found, screws 32 can be tightened to prevent further rotational movement of handle 22 and to prevent handle 22 from moving axially upon lever 16. It is to be understood that the use of plates 28 and 30 is only one method of attaching handle 22 to lever 16 and that other methods can be used as well. In a preferred embodiment, hand grip 26 is textured so as to facilitate a firm grip by the user.

Referring to FIG. 4, there is shown an alternate embodiment of handle 22. Handle 22' comprises shaft 24', clamping plate 28' and complementary clamping plate 30'. Shaft 24' is generally identical in construction to shaft 24 (see FIG. 3). Similarly, plates 28' and 30' are substantially the same in construction and function in the same manner as plates 28 and 30, respectively (see FIG. 3). Screws 32' and nuts 34' function in the same manner as screws 32 and nuts 34, respectively (see FIG. 3). Plates 28' and 30' have openings 29' and 31', respectively, for receiving screws 32'. Handle 22' further includes loop-shaped hand grip 40 that is attached shaft 24'. Hand grip 40 defines an opening 42 that permits a user to insert his or her fingers. Hand grip 40 further includes a top portion 44, inner surface 46 and ribs 48 that extend from surface 46. Ribs 48 facilitate a firm grip by the user whereby the user grasps top portion 44 and places his or her fingers between ribs 48.

Figure 6:
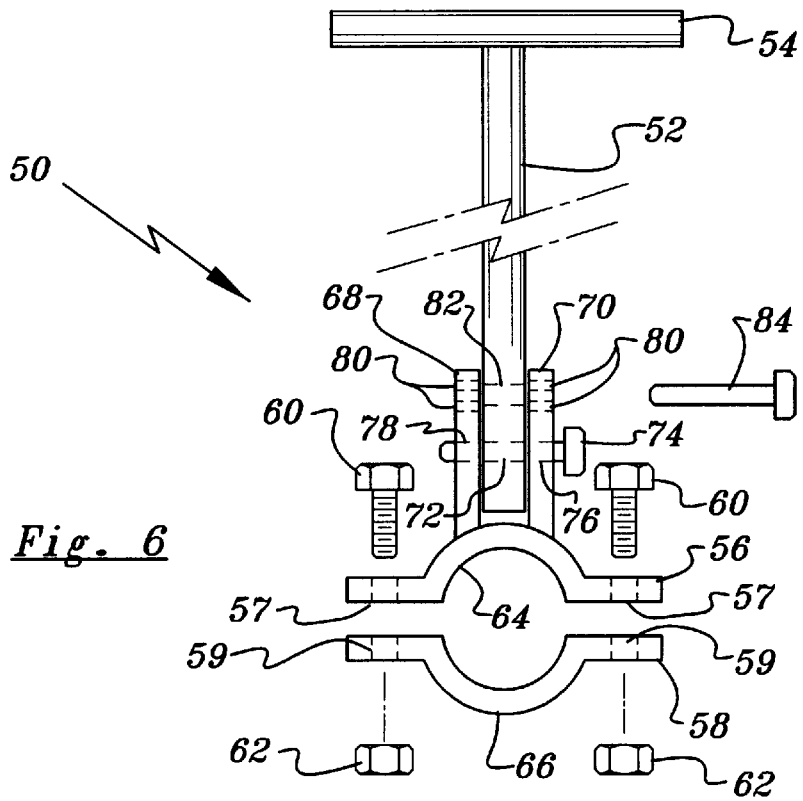
FIG. 6 is a front elevational view of the another embodiment of the extension handle depicted in FIG. 3.

Referring to FIGS. 5 and 6, there is shown a further embodiment of handle 22. Alternate handle 50 comprises shaft 52, hand grip 54, clamping plate 56, and complementary clamping plate 58. Plates 56 and 58 have openings 57 and 59, respectively, for receiving screws 60. Screws 60 and nuts 62 are used to fasten together plates 56 and 58. Plates 56 and 58 have inner surfaces 64 and 66, respectively, that contact the exterior surface of lever 16 when plates 56 and 58 are fastened together. Inner surfaces 64 and 66 have curvatures that generally conform to the curvature of lever 16. It is to be understood that plates 56 and 58 may be configured to have other shapes in the event lever 16 has a cross-sectional shape other than circular. When mounting handle 50 to lever 16, the user tighten screws 60 to a degree that allows the user to rotate handle 50 about lever longitudinal axis 17 in order to determine an optimum position of handle 50. Once such an optimum position is found, screws 60 can be tightened to prevent further rotational movement of handle 50 and to prevent handle 50 from moving axially upon lever 16. Handle 50 further comprises upstanding brackets 68 and 70 that are attached to plate 56. Handle 50 has a bore 72 that is sized for receiving pin or key 74. Similarly, brackets 68 and 70 have openings 76 and 78, respectively, that are with aligned bore 72 and sized for receiving pin or key 74. Thus, handle 50 pivots about pin 74 as indicated by arrow 79 (see FIG. 5). Brackets 68 and 70 further include a plurality of openings 80 that are arranged in a generally arcuate formation (see FIG. 5). Handle 50 further includes bore 82 that can be aligned with any of the openings 80 of brackets 68 and 70 by pivoting handle 50 so that bore 82 is aligned with the desired openings 80. Thus, handle 50 can be pivoted to any angular position with respect to longitudinal axis 17 of lever 16, and then locked in that position by inserting pin or key 84 through the desired opening 80 of bracket 70, bore 82 and the corresponding opening 80 in bracket 68. If a new angular position of handle 50 is desired, the user removes pin 84, pivots handle 50 to the new position, then inserts pin 84 through the corresponding opening 80 of bracket 70, bore 82 and the corresponding opening 80 of bracket 68. Thus, during installation of handle 50, handle 50 can be rotated about lever axis 17 to a desired position and then pivoted to a desired angular position with respect to lever axis 17.

Figure 7:
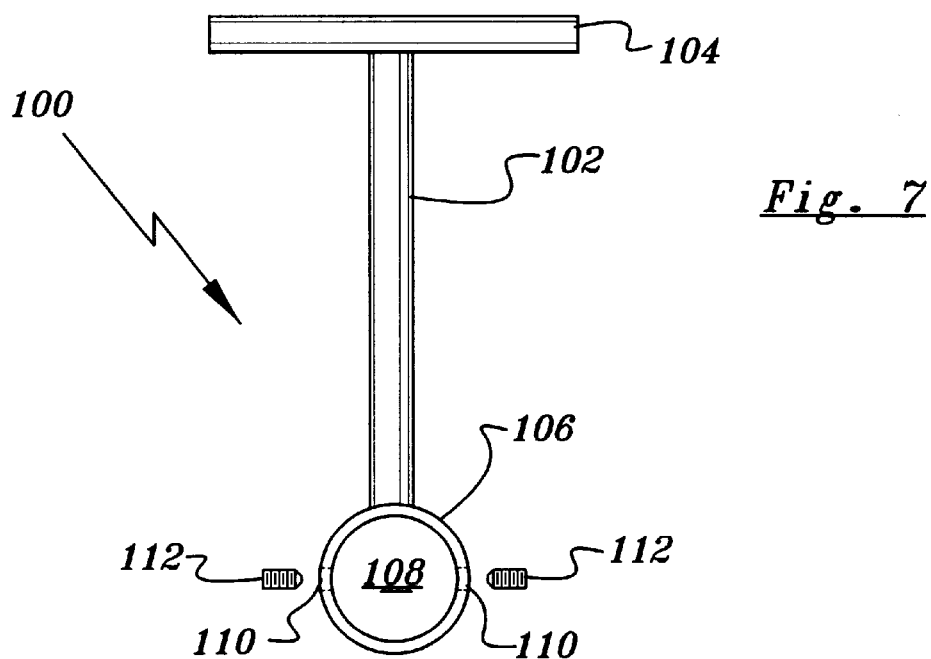
FIG. 7 is a front elevational view of a further embodiment of the extension handle depicted in FIG. 3.

Referring to FIG. 7, there is shown another alternate embodiment of handle 22. Alternate handle 100 comprises shaft 102 and hand grip 104 that is attached to shaft 102. Handle 100 further comprises a generally tubular base 106 that is attached to shaft 102. Base 106 defines central opening 108 that is sized for receiving lever 16. Base 106 includes threaded inlets 110 for receiving screws 112. In a preferred embodiment, screws 112 are of the Allen screw type. In order to attach handle 100 to lever 16, the user inserts lever 16 through opening 108 and then axially moves handle 100 upon lever 16 to a desired or optimum position and then rotates handle 100 about lever axis 17 to find an optimum position. Once the optimum position is found, the user then tightens screws 112 so that screws 112 contact the exterior surface of lever 16 thereby locking handle 100 in place.

Figure 8:
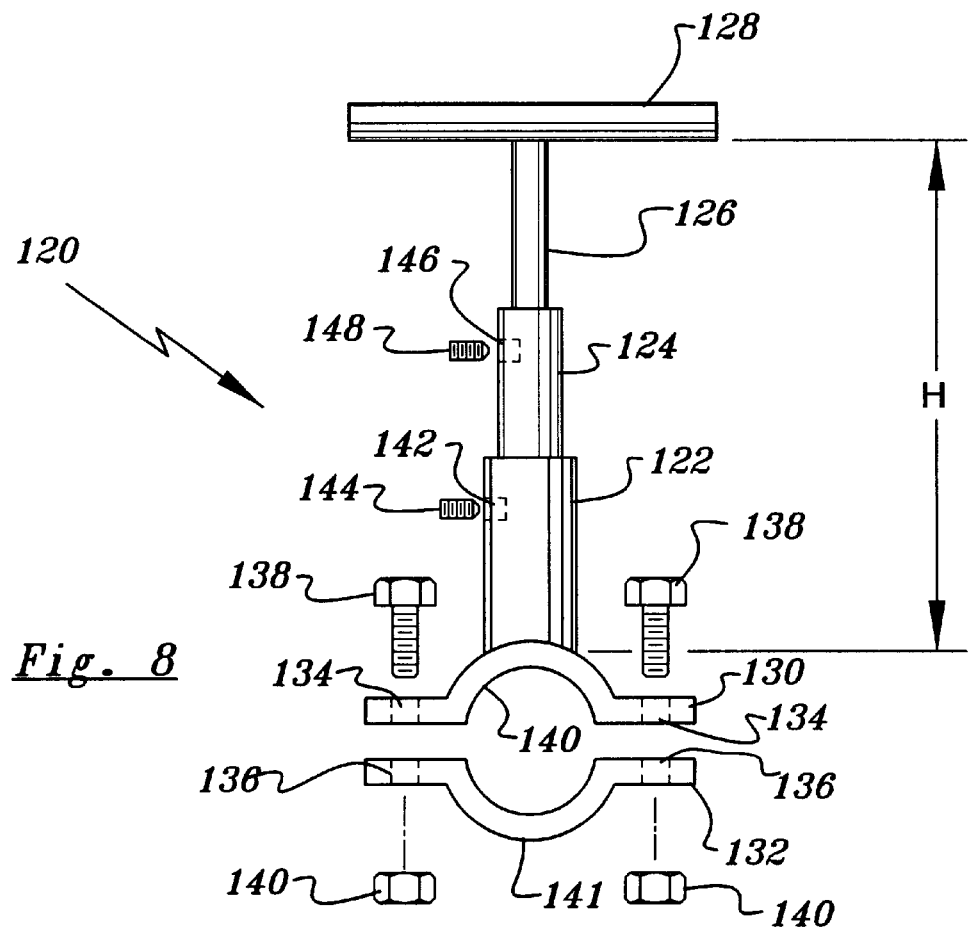
FIG. 8 is a front elevational view of yet another embodiment of the extension handle depicted in FIG. 3.

Referring to FIG. 8, there is shown another alternate embodiment of handle 22. Alternate handle 120 comprises three (3) telescopically arranged shaft sections 122, 124 and 126. Although three (3) shaft sections are shown, it is to be understood that there can be more than or less than three (3) shaft sections. Shaft section 126 is slidably disposed within shaft section 124. Similarly, shaft section 124 is slidably disposed within shaft section 122. Handle 120 includes hand grip 128 that is attached to shaft section 126. Handle 120 further includes clamping plate 130, and complementary clamping plate 132. Shaft section 122 is attached to clamping plate 130. Plates 130 and 132 have openings 134 and 136, respectively, for receiving screws 138. Nuts 140 are threadedly engaged to screws 138 to fasten together plates 130 and 132. Plates 130 and 132 have inner surfaces 140 and 141, respectively, that contact the exterior surface of lever 16 when plates 130 and 132 are fastened together. Inner surfaces 140 and 141 have curvatures that generally conform to the curvature of lever 16. It is to be understood that plates 130 and 132 may be configured to have other shapes in the event lever 16 has a cross-sectional shape other than circular. Once plates 130 and 132 are fastened together, handle 120 is rigidly, but removably, attached to lever 16. When mounting handle 120 to lever 16, the user tightens screws 138 to a degree that allows the user to rotate handle 120 about lever longitudinal axis 17 and axially move handle 120 upon lever 16 in order to determine an optimum position of handle 120. Once such an optimum position is found, screws 138 can be tightened to prevent further rotational movement of handle 120 and to prevent handle 120 from moving axially upon lever 16. It is to be understood that plates 130 and 132 constitutes just one method of attaching handle 120 to lever 16 and that other methods can be used as well. In a preferred embodiment, hand grip 128 is textured so as to facilitate a firm grip by the user.

Referring again to FIG. 8, shaft section 122 has a threaded inlet 142 that is sized for receiving screw 144. Similarly, shaft section 124 has a threaded inlet 146 that is sized for receiving screw 148. In a preferred embodiment, screws 144 and 148 are of the Allen type. Thus, the user is able to adjust the overall height H of handle 120 to his or her particular needs. For example, the user first slides shaft section 124 within shaft section 122 to a desired position and then locks shaft section 124 in that position by tightening screw 144 so that screw 144 contacts shaft section 124 to prevent further movement thereof. Then, the user slides shaft section 126 within shaft section 124 to a desired position and then locks shaft section 126 in that position by tightening screw 148 so that screw 148 contacts shaft section 126 to prevent further movement thereof. Thereafter, the height H of handle 120 can be adjusted to suit the needs of other drivers. Handles 22, 22', 50, 100 and 120, when attached to lever 16, enable a vehicle driver to remain in an upright posture in his/her seat at all times when engaging and disengaging the parking/safety brake lever without diverting his or her vision below the dashboard thereby maintaining visual contact with surrounding traffic, pedestrians, etc. In particular, handles 22, 22', 50, 100 and 120 enable a school bus driver to remain in an upright posture in his/her seat at all times when engaging and disengaging the parking/safety brake lever thus keeping the students in constant sight as they approach or depart the bus in a multitude of directions as well as all approaching and surrounding traffic.

The capability of adjusting the position of handles 22, 22', 50, 100 and 120 when mounted on lever 16 enables the vehicle drivers to engage and disengage the parking/safety brake with significantly greater ease for the driver, therefore increasing the probability that the regulation requiring application of the emergency or safety brake will be consistently complied with. Furthermore, handles 22, 22', 50, 100 and 120, when attached to lever 16, provide improved ergonomic positioning of the driver thereby decreasing the likelihood of muscololigamentous strain, injury and lost time at work.

Handle 22, 22', 50, 100 and 120 can be manufactured from a variety of materials. However, in a preferred embodiment, handles 22, 22', 50, 100 and 120 are fabricated from metal such as stainless steel, aluminum, iron, etc. In a most preferred embodiment, handles 22, 22', 50, 100 and 120 are fabricated from non-corrosive metals. Furthermore, handles 22, 22', 50, 100 and 120 can be manufactured at a reasonable cost, and inexpensively attached to existing emergency brake levers or attached to emergency brake levers during the manufacture of the vehicle.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. In combination:

a vehicle emergency brake system comprising an emergency brake and an elongate hand lever that is vertically movable to a first position to engage the emergency brake and to a second position to release the emergency brake;

an extension handle comprising an elongate member having a first end portion attached to the elongate hand lever and a second end portion opposite the first end, the second end portion comprising a hand grip, the first end portion comprising a hollow member generally perpendicular to the elongate member of the extension handle and having an interior space therein sized for receiving the elongate hand lever, the elongate member of the extension handle being generally perpendicular to the elongate hand lever, and means attached to the first end portion for enabling the extension handle to rotate about and move axially with respect to the elongate hand lever so as to allow an operator of the vehicle to adjust the position of the extension handle with respect to the driver, and restricting movement of the extension handle with respect to the elongate hand lever;

the extension handle enabling the operator of the vehicle to maneuver the elongate hand lever of the emergency brake without (i) diverting the operator's line of vision below the vehicle windshield, and (ii) sustaining muscular or bodily strain.

2. The combination according to claim 1 wherein the hand grip member has an exterior surface that is textured to facilitate gripping the hand grip.

3. The combination according to claim 1 wherein the hand grip member comprises a loop shaped member attached to the second end, the loop shaped member defining an opening that permits the operator to wrap his or her hand around a portion of the loop shaped member.

4. The combination according to claim 1 wherein the handle is pivotally attached to the elongate brake lever.

5. The combination according to claim 4 further comprising a device for locking the handle in a particular position to prevent further pivotal movement of the handle.

6. The combination according to claim 5 wherein the handle having an opening in proximity to the first end, the device comprising:

a bracket attached to the brake lever, the bracket having a plurality of openings arranged in an arc; and an interfering member that is sized for insertion into any of the openings in the bracket and the opening in the handle so as to lock the handle in particular angular orientation with respect to the brake lever.

7. The combination according to claim 1 wherein the hollow member comprises a generally tubular member.

8. The combination according to claim 1 wherein the handle comprises a plurality of telescopically arranged sections.

9. The combination according to claim 1 wherein the extension handle has a generally circular cross-section.

* * * * *